US005495904A

United States Patent [19]

Zwaan et al.

[11] Patent Number: 5,495,904

[45] Date of Patent: Mar. 5, 1996

[54] WHEELCHAIR POWER SYSTEM

[75] Inventors: Paul Zwaan; Peter A. Nyberg, both of Auckland, New Zealand

[73] Assignee: Fisher & Paykel Limited, Auckland, New Zealand

[21] Appl. No.: 305,185

[22] Filed: Sep. 13, 1994

[30] Foreign Application Priority Data

Sep. 14, 1993 [NZ] New Zealand ............................ 248656

[51] Int. Cl.[6] ...................................................... B62D 11/04

[52] U.S. Cl. ............................ 180/11; 180/6.5; 180/65.1; 180/907; 280/304.1

[58] Field of Search .............................. 180/11, 6.48, 6.5, 180/16, 54.1, 65.1, 65.6, 65.8, 907; 280/304.1, 250.1

[56] References Cited

U.S. PATENT DOCUMENTS

| | | | |
|---|---|---|---|
| 2,635,703 | 4/1953 | Goeller | 180/13 |
| 3,896,891 | 7/1975 | Miltenburg et al. | 180/6.5 |
| 3,955,639 | 5/1976 | Cragg | 180/6.5 |
| 4,199,036 | 4/1980 | Wereb | 180/6.5 |
| 4,415,049 | 11/1983 | Wereb | 180/6.5 |
| 4,671,524 | 6/1987 | Haubenwallner | 280/212 |
| 4,961,473 | 10/1990 | Jones | 180/65.1 |
| 5,016,720 | 5/1991 | Coker | 180/13 |
| 5,186,269 | 2/1993 | Avakian et al. | 180/6.5 |
| 5,234,066 | 8/1993 | Ahsing et al. | 180/6.5 |
| 5,246,082 | 9/1993 | Alber | 180/65.5 |
| 5,291,959 | 3/1994 | Malblanc | 180/11 |

FOREIGN PATENT DOCUMENTS

| | | | |
|---|---|---|---|
| 382873A1 | 8/1990 | European Pat. Off. . | |
| 1506571 | 4/1978 | United Kingdom | 180/907 |
| 2102360 | 2/1983 | United Kingdom | 180/907 |
| 2188889 | 10/1987 | United Kingdom . | |

OTHER PUBLICATIONS

HNE Mobility Sales Publication, "Harrier–Practical & Portable," Copyrighted by Huntleigh Technology plc, 1991.

sani–trans® publication, "Power Kit," Derk Wolfslast.

efix publication, Ulrich Alber GmbH.

*Primary Examiner*—Kevin T. Hurley

*Attorney, Agent, or Firm*—Trexler, Bushnell, Giangiorgi & Blackstone, Ltd.

[57] ABSTRACT

A power system for wheelchairs is described, in particular for wheelchairs of the foldable type with quick-release wheel axles 1, the power system having two compact drive units, which are affixable and removable without the use of tools. The drive units connect vertically to complementary mounting brackets fixed to the wheelchair frame. The drive system also includes a control unit 51 for controlling power supply to each drive unit from batteries 41 held in under-slung battery tray 42. The power system is retrofittable to existing wheelchairs, and is designed for easy removal.

17 Claims, 5 Drawing Sheets

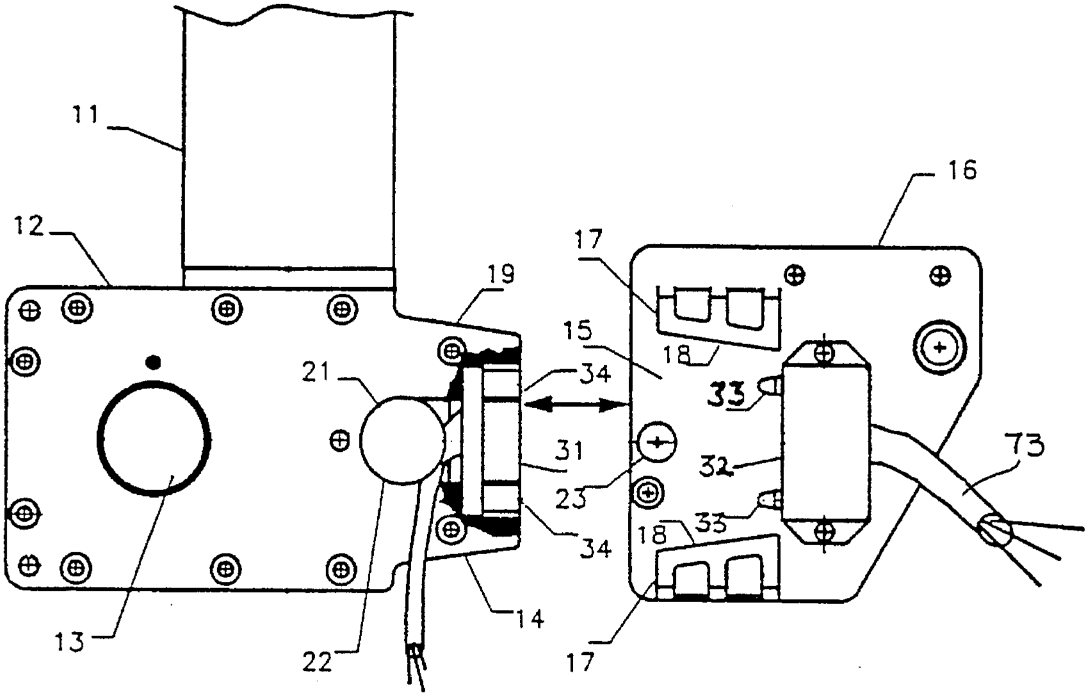
FIG 2
FIG 3
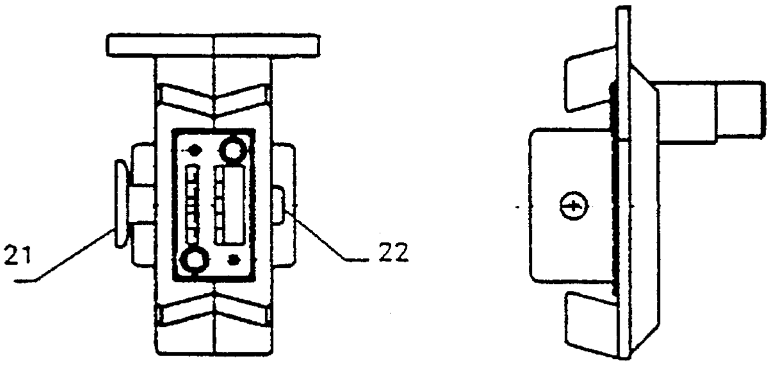
FIG 9

WHEELCHAIR POWER SYSTEM

BACKGROUND TO THE INVENTION (1) Field of the Invention

This invention relates to powered wheelchairs and in particular but not solely to wheelchairs which may be converted from manual propulsion to powered propulsion.

(2) Description of the Prior Art

The overwhelming majority of conventional wheelchairs in current use are designed to fold for easy transportation. Powered wheelchairs have generally been developed using conventional wheelchair designs as a basis and therefore mostly retain the folding features, although the addition of motors, controller and battery mountings tend to make them rather heavy and ungainly to lift. To combat this, a small number of manufacturers have developed detachable drive systems. However, these tend to fall in one of two categories; either low power units (often with only a single motor) or heavy one-piece drive units, which remain the heaviest part of the wheelchair to lift. In both categories it is only possible to fold the wheelchair after the drive unit has been removed, so that the option of transporting or storing it as a complete folded unit is lost. Some designs retain the ability to propel the wheelchair manually, which is an advantage for users with progressive disabilities or limited ability to propel themselves. However, this feature is usually confined to low power types.

BRIEF SUMMARY OF THE INVENTION

It is therefore an object of the present invention to provide a wheelchair and/or wheelchair power system which goes some way towards overcoming the abovementioned disadvantages or which at least provides purchasers with a useful choice.

Accordingly in one aspect the invention may broadly be said to consist in a drive unit for a powered wheel chair comprising:

an electric motor having a rotor and a case, a shaft driven by said rotor, said shaft adapted to have a wheelchair drive wheel mounted thereon, said shaft in static spatial position relative to said motor case, a substantially vertically extending first connector mechanically coupled to and stationary relative to said motor case, and a complementary shaped second connector within which said first connector engages in use and to restrict an engaged said first connector from all relative rotational movement and allow relative axial movement of said first connector in only a substantially vertical downward direction, said second connector adapted to be mounted on a wheelchair frame.

In a second aspect the invention may broadly be said to consist in a power system for wheelchairs for use with a battery power supply, said power system comprising:

two separate clip-on drive units which mount substantially vertically on a wheelchair frame, each drive unit including an electric motor, said motor having a case and a rotor, a wheel driven by said electric motor rotor, said wheel in static spatial position relative to said motor case and a substantially vertically extending first connector mechanically coupled to and stationary relative to said motor case; two complementary shaped second connectors within which said first connectors engage in use, said second connectors adapted to be mounted on a wheelchair frame and to restrict engaged said first connectors from all relative rotational movement and allow relative axial movement of said first connectors in only a substantially vertical downward direction; and a detachable motor drive electronic controller which mounts in proximity to an arm rest of a wheelchair;

said controller adapted to control power applied from a battery to each individual motor and including a hand actuated control stick which provides input signals to said motor drives to selectively determine power supplied to said drive units thereby controlling the speed and direction of travel of a wheelchair with said power system attached.

In a third aspect the invention may broadly be said to consist in a wheelchair adapted to receive the clip-on power system defined above.

In a fourth aspect the invention may broadly be said to consist in a wheelchair fitted with the power system defined above.

BRIEF DESCRIPTION OF THE DRAWINGS

The preferred form of the invention will now be described with reference to the accompanying drawings in which;

FIG. 2 is a partial elevation of a clip-on drive unit (with wheel removed) in accordance with the present invention, FIG. 3 is a side elevation of a connector plate which mounts on a wheelchair frame to receive the drive unit shown in FIG. 2, FIG. 9 is an end view of a part of an alternative drive unit to that shown in FIGS. 4 and 5.

DETAILED DESCRIPTION

Before describing the construction of the preferred form of the invention the general features of the invention will be outlined.

Figure 1:
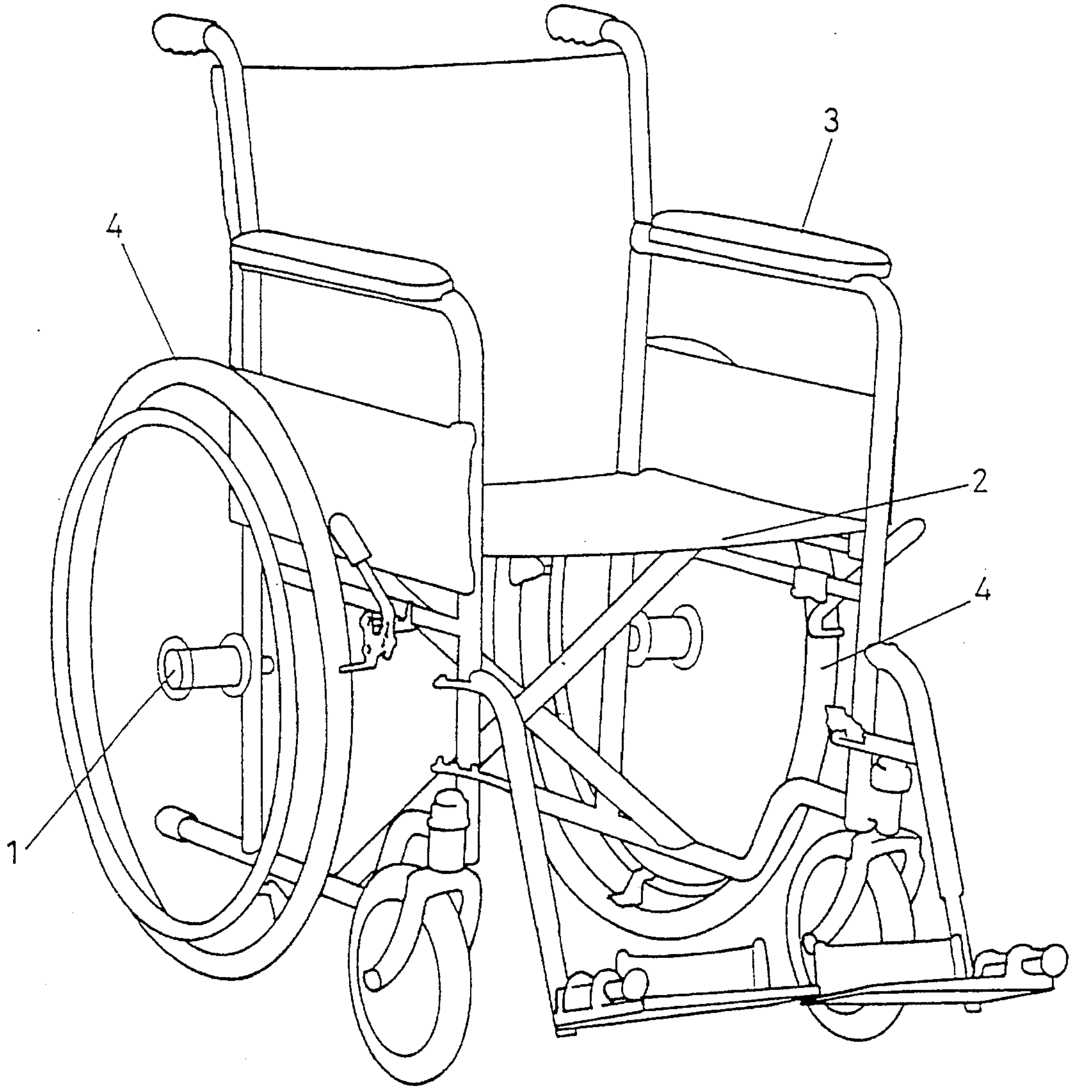
PRIOR ART FIG 1
FIG. 1 shows a typical conventional foldable wheelchair to which the present invention may be applied.

The conventional wheelchair design to which the present invention is typically affixed is the folding type, with quick release rear wheel axles 1 as shown in FIG. 1. In the preferred form of the present invention the side plates for these axles are replaced with modified types which also incorporate dovetail-shaped receivers for clip-on drive units. Each of the two drive units provided consists of an individual geared-motorised-wheel incorporating a failsafe solenoid-operated park brake and also a clutch mechanism which disconnects the motor drive so that the wheelchair may be pushed by an attendant. Alternatively a mechanical release type brake may be fitted, so that the attendant may push the wheelchair without the need for a wheel clutch mechanism. Each drive-unit receiver may incorporate an electrical connector, to make assembly easy and reliable. A battery tray is provided which is slung under the seat 2. A controller unit is provided and is preferably mounted against either armrest 3 in an adjustable manner. The mount for the controller preferably has at least a fore-aft slide for easy adjustment and removal, with a clamp to secure it in the desired position.

A wiring harness provided interconnects the batteries, controller and motors and is preferably clipped on to the wheelchair frame for easy removal. All of the power system components are quickly removed from the wheelchair without tools and simple replacement of the quick-release manual wheels 4 converts the wheelchair back to its conventional manually propelled form. The invention is appropriate to most folding wheelchair designs with minor adjustments or alterations to the mounting brackets. Anti-tip wheels 24 (see FIG. 5) are preferably provided on the rear of the chair which not only protect against tipping backward when climbing obstacles, but are also useful during removal of the clip-on drive system.

Figure 4:
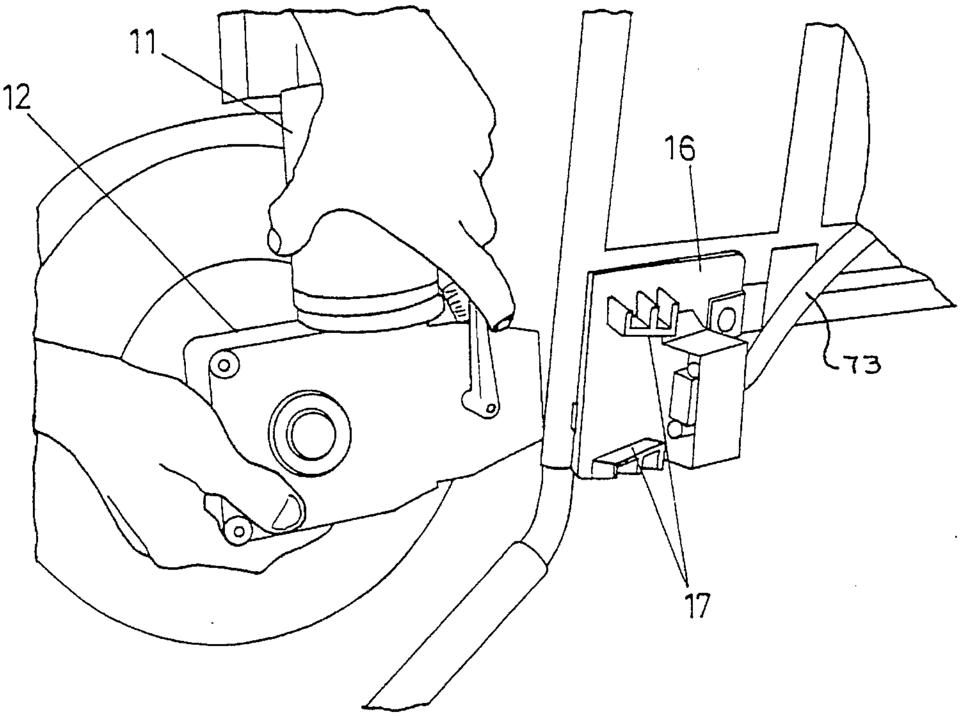
FIG. 4 shows a perspective view of a connector plate mounted on a wheelchair and a drive unit positioned for engagement with the plate.

Referring to FIG. 2, one of two drive units provided by the present invention is shown with wheel removed. Part of electric motor 11 is shown mechanically coupled to a gear box 12, the output shaft (not shown) of which forms the driven wheel axle which extends from the gear box case opposite embossment 13. The gear box casing is provided with a connector portion 14 which is shaped so as to slidingly engage within a complementary shaped receiver 15 integrally formed in connector plate 16 (see FIG. 3) which in use is bolted to the wheelchair frame as can be seen in FIG. 4. Receiver 15 is in the preferred form shown configured as a dove tail joint by the use of projections 17 which have edge faces 18 tapering outwardly towards the face of plate 16 to form a compound taper. Side edges 19 of a gear box connector portion 14 have matching compound tapers so that connector 14 can slidably engage within receiver 15.

Figure 5:
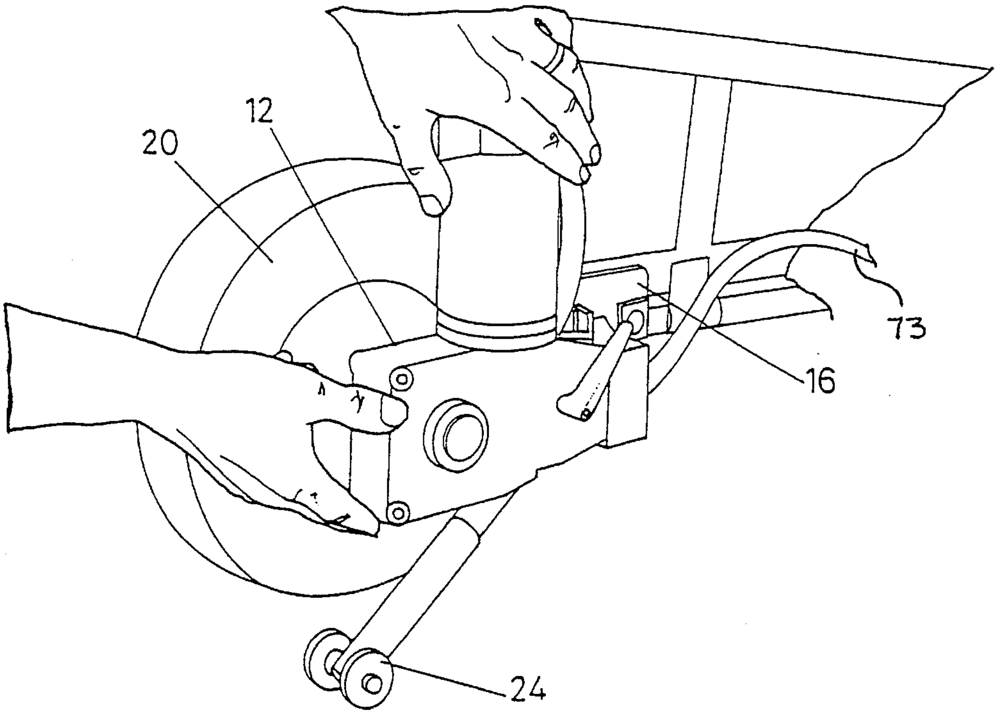
FIG. 5 is a similar view to that in FIG. 4 but with the drive unit engaged with the connector plate.

The drive unit including wheel 20 is shown engaged with connector plate 16 in FIG. 5. When fully slid home locking handle 21 is preferably sprung back against a cam surface on the gear box casing to cause the pin 22 to which the handle is attached to extend beyond the casing surface into aperture 23 provided in plate 16. Instead of the cam arrangement described a spring back pin may be used as shown in FIG. 9. A knob 21 is provided to actuate pin 22.

It will be understood that in use the action of gravity will generally tend to maintain the drive unit in place. The continuing pressure in the vertical direction serves to eliminate potential slop and keep a rigid connection. This is further assisted by the use of the tapered connection. The rigid connection improves the ride quality and responsiveness of the wheelchair.

It should be understood that the drive unit and connector plate as shown in FIGS. 2 to 5 are rotated 90° from the position they assume when the wheelchair is resting on its normal four wheels. In FIGS. 4 and 5 the wheelchair is shown tipped on its rear end so as to be supported by two auxiliary anti-tip wheels 24 and the wheelchair handles 25. The disposition of the anti-tip wheels 24 and handles 25 can be seen in FIG. 6. It is with the wheelchair in this stable position that the drive units are intended to be connected to the chair frame, taking advantage of the units' connecting to the wheelchair frame from below.

When each drive unit is mechanically engaged with receiver 15 electrical connections for the electric motor are also made. As the drive unit is slid into receiver 15 the mating multi pin electrical connectors 31 and 32 engage and full connection is achieved when connector portion 14 is fully in place within receiver 15. Electrical connectors 31 and 32 are preferably of the hermaphroditic type and float within their mechanical housings so that with the aid of tapered locating pins 33 and corresponding tapered cavities 34 they self align as the connection is made (see FIGS. 2–3).

Figure 6:
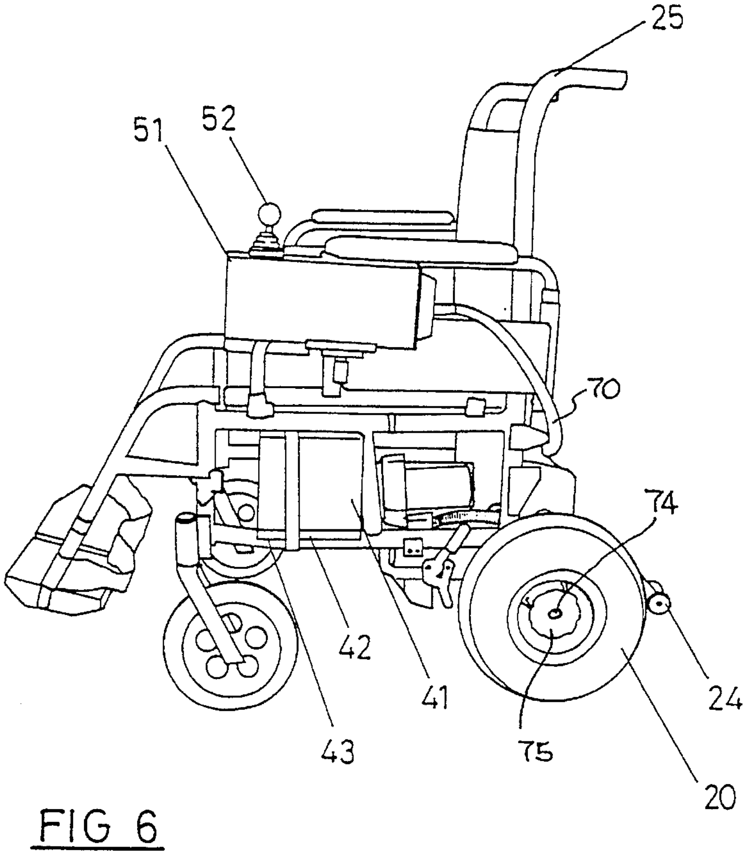
FIG. 6 is a side elevation of a wheelchair fitted with a power system in accordance with the present invention.
Figure 7:
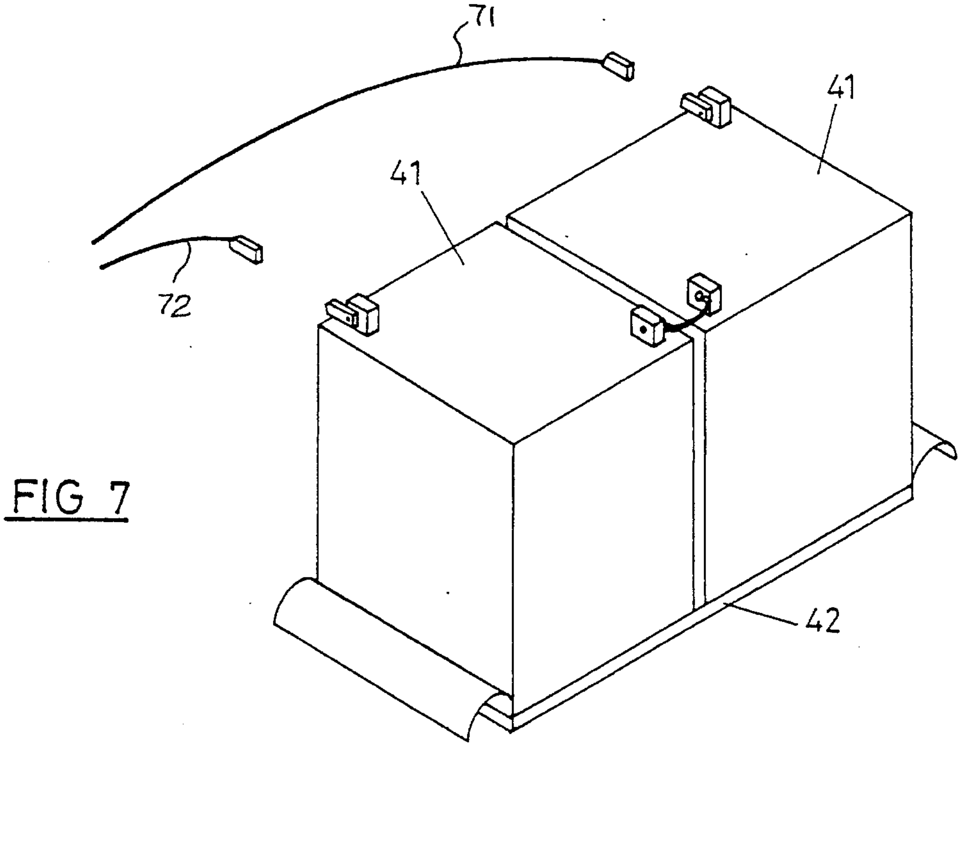
FIG. 7 is an isometric view of one arrangement of a battery tray (loaded with two batteries) provided as part of the present power system.

A second component of the power system of the present invention is the power supply and this is provided by batteries 41 carried in a battery tray 42 which in one preferred arrangement transversely straddles opposite lower members of the wheelchair frame 43 (see FIGS. 6 and 7). The power supply is thus located under the wheelchair seat 2. The fore-aft position of the tray is selected for best weight distribution for chair to which it is fitted. Other tray configurations may be required if the tray is to be positioned differently to that shown in the present drawings. Batteries 41 may comprise sealed rechargeable lead acid batteries of a known type.

The third major component of the present power system is a controller unit 51 which controls power supplied to each motor in each drive unit to thereby control the speed and direction of the wheelchair. The controller input is received via a joy stick 52 manipulated by the wheelchair user. Such joy stick control is well known in the art and various types of known controllers could be used.

Figure 8:
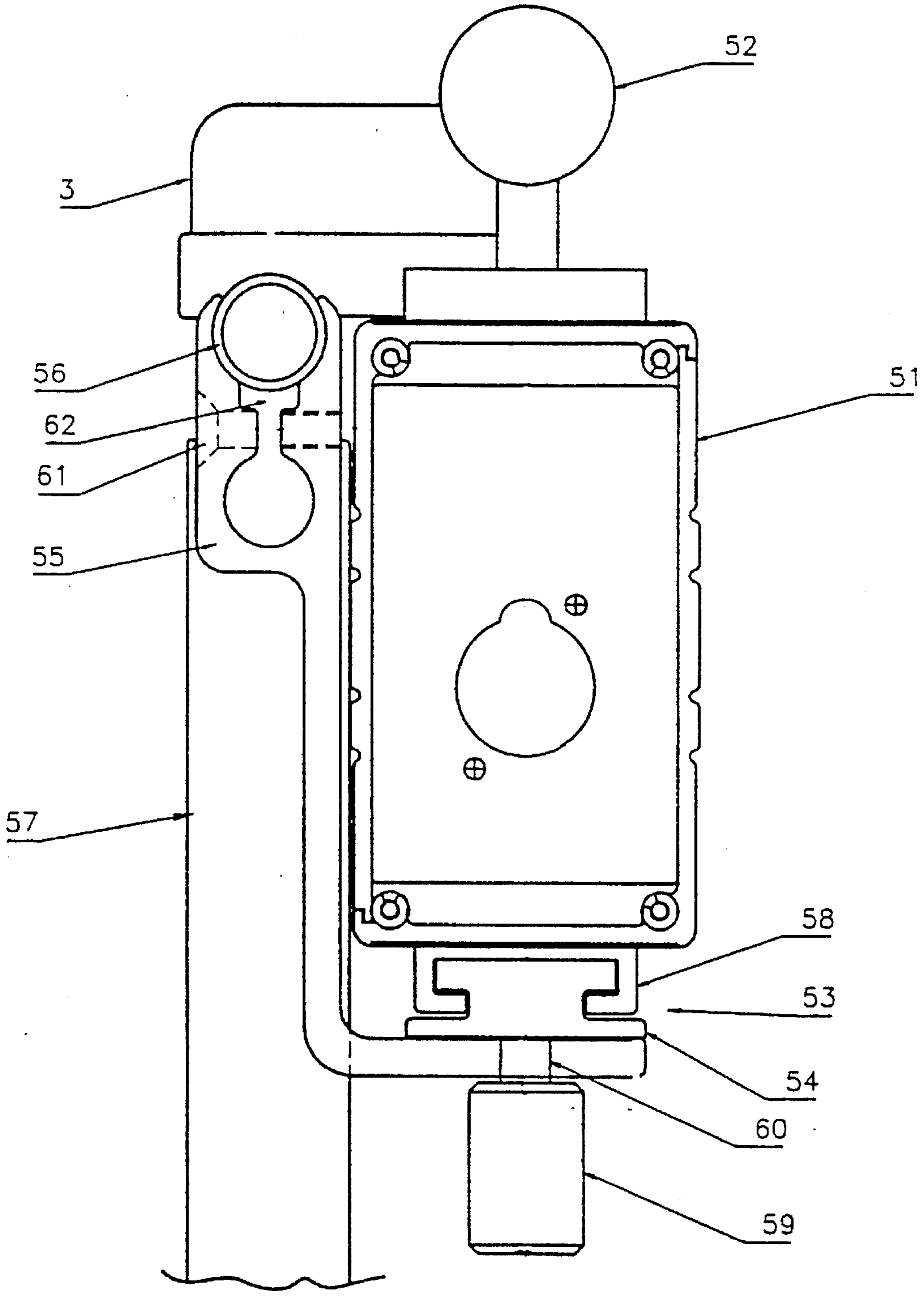
FIG. 8 shows an end elevation of a controller unit for the power system in position against the wheelchair armrest.

Controller 51 is releasably mounted to the wheelchair frame by a slide action coupling 53 (see FIG. 8), the male member 54 of which is connected to a bracket 55 which in turn is mounted on the wheelchair armrest frame 56. The base of controller 51 has a female slide member 58 which engages with male slide member 54. When controller 51 is slid in a fore-aft direction so that joy stick 52 is at an appropriate location relative to the wheelchair arm rest 3 the controller 51 is locked in position by rotation of a knob 59 which causes the threaded shaft 60 to protrude through male slide member 54 and bear against the surface of female slide member 58.

Further forward movement can be gained by loosening the clamp screw 61 and sliding the mount bracket up and down the armrest mount tube 56, the slot 62 enables the bracket 55 to be positioned anywhere under the armrest without risk of binding on the armrest (3) attaching screws which generally protrude through the bottom of the armrest frame (56). It can be seen that the controller unit may be mounted on either arm of the wheelchair, to accommodate either right- or left-handed control.

With the drive units, power supply and controller in place, a wiring harness connecting these four components may be fitted. The harness is configured as a five limbed star, two limbs each connecting to a respective drive unit receiver connector, two limbs each connecting to a respective battery terminal and the fifth limb connecting to the controller unit. The hub of the star is preferably clipped to the wheelchair cross member.

It will be appreciated from the above that the present invention provides a wheelchair and/or drive system for a wheelchair which has the following advantages:

1. The drive system may be removed quickly and easily (without tools) for transport,
2. The wheelchair remains foldable with drive system fitted for quick storage and transport,
3. The drive units detach individually, for light weight and ease of disassembly,
4. The system utilises automatic electrical connections for easy and safe reassembly, 5. The wheelchair may be converted back to manual operation quickly and, easily without tools, and 6. The powerful drive units exceed the performance benchmarks for powered wheelchairs including non-dismantleable types.

I/we claim:

1. A drive unit for a powered wheel chair comprising:

an electric motor having a rotor and a case, a shaft driven by said rotor, said shaft adapted to have a wheelchair drive wheel mounted thereon, said shaft in static spatial position relative to said motor case, a substantially vertically extending first connector mechanically coupled to and stationary relative to said motor case, and a complementary shaped second connector within which said first connector engages in use and to restrict an engaged said first connector from all relative rotational movement and allow relative axial movement of said first connector in only a substantially vertical downward direction, said second connector adapted to be mounted on a wheelchair frame.

2. A drive unit as claimed in claim 1 including a speed reduction gearbox, interposed between said rotor and said shaft, and wherein said first connector is secured to said gearbox.

3. A drive unit for a powered wheelchair as claimed in claim 1 wherein said first connector is tapered and said second connector has a complementary taper.

4. A drive unit for a powered wheelchair as claimed in either claim 1 or claim 3 wherein said first connector is a dovetailed tenon, and said second connector is a mortice, for receiving said tapered dovetailed tenon.

5. A drive unit for a powered wheelchair as claimed in claim 1 wherein said first connector includes a springback pin, and said second connector includes an aperture, said springback pin engaging in said aperture when said first and second connectors are engaged.

6. A drive unit for a powered wheelchair as claimed in claim 1 wherein a first electrical connection means is associated with said first connector, and a second electrical connection means is associated with said second connector, and the location and alignment of said electrical connection means is such that engagement of said first connector and said second connector causes electrical connection to be established between said first and second electrical connection means.

7. A drive unit for a powered wheelchair as claimed in claim 6 wherein said first connector has a depression in its top surface and said first electrical connection means is located in said depression.

8. A drive unit for a powered wheelchair as claimed in claim 1 wherein the axis of said electric motor is perpendicular to the axis of said shaft adapted to have a drive wheel mounted thereon.

9. A drive unit for a powered wheelchair as claimed in claim 1 including a wheel mounted on said shaft adapted to have a wheel mounted thereon, and a clutch to hold said wheel in fixed relation to said shaft.

10. A drive unit for a powered wheelchair as claimed in claim 9 wherein said clutch is releasable to allow said wheel to rotate freely relative to said shaft, about said shaft.

11. A power system for wheelchairs for use with a battery power supply, said power system comprising two separate clip-on drive units which mount substantially vertically on a wheelchair frame, each drive unit including an electric motor, said motor having a case and a rotor, a wheel driven by said electric motor rotor, said wheel in static spatial position relative to said motor case and a substantially vertically extending first connector mechanically coupled to and stationary relative to said motor case; two complementary shaped second connectors within which said first connectors engage in use, said second connectors adapted to be mounted on a wheelchair frame and to restrict engaged said first connectors from all relative rotational movement and allow relative axial movement of said first connectors in only a substantially vertical downward direction; and a detachable motor drive electronic controller which mounts in proximity to an arm rest of a wheelchair said controller adapted to control power applied from a battery to each individual motor and including a hand-actuated control stick which provides input signals to said motor drives to selectively determine power supplied to said drive units thereby controlling the speed and direction of travel of a wheelchair with said power system attached.

12. A power system for wheelchairs as claimed in claim 11 wherein a wheelchair with said power system attached is foldable and remains foldable with the components of said power system clipped in place at least once the battery power supply is removed.

13. A power system for wheelchairs according to claim 11 wherein the clip-on components are mountable and demountable without the use of tools.

14. A power system for wheelchairs as claimed in claim 11 further including a wiring harness for electrical conduction between a battery and said controller and said drive-units, said wiring harness attachable to the frame of said wheelchair.

15. A wheelchair adapted to receive a power system comprising:

two separate clip-on drive units which mount vertically on the wheelchair frame, each drive unit including an electric motor, said motor having a case and a rotor, a wheel driven by said electric motor rotor, said wheel in static spatial position relative to said motor case and a substantially vertically extending first connector mechanically coupled to and stationary relative to said motor case; two complementary shaped second connectors within which said first connectors engage in use, said second connectors adapted to be mounted on a wheelchair frame and to restrict engaged said first connectors from all relative rotational movement and allow relative axial movement of said first connectors in only a substantially vertical downward direction;

and detachable motor drive electronic controller which mounts in proximity to an armrest for the wheelchair;

said controller controlling power applied from a battery to each individual motor and including a hand-actuated control stick which provides input signals to said motor drives to selectively determine power supplied to said drive units, thereby controlling the speed and direction of travel of said wheelchair.

16. A wheelchair as claimed in claim 15 wherein the detachable motor drive controller is slidingly adjustable in at least the forward direction.

17. A wheelchair fitted with a power system comprising:

two separate clip-on drive units which mount vertically on the wheelchair frame, each drive unit including an electric motor, said motor having a case and a rotor, a wheel driven by said electric motor rotor, said wheel in static spatial position relative to said motor case and a substantially vertically extending first connector mechanically coupled to and stationary relative to said motor case; two complementary shaped second connectors within which said first connectors engage in use, said second connectors adapted to be mounted on a wheelchair frame and to restrict engaged said first connectors from all relative rotational movement and allow relative axial movement of said first connectors in only a substantially vertical downward direction;

and detachable motor drive electronic controller which mounts in proximity to an armrest fore the wheelchair; said controller controlling power applied from a battery to each individual motor and including a hand-actuated control stick which provides input signals to said motor drives to selectively determine power supplied to said drive units, thereby controlling the speed and direction of travel of said wheelchair.

* * * * *